United States Patent Office 3,743,696
Patented July 3, 1973

3,743,696
SEPARATION OF AMERICIUM AND CURIUM
George W. Mason, Clarendon Hills, Ill., Allen F. Bollmeier, Jr., Terre Haute, Ind., and Donald F. Peppard, Oak Park, Ill., assignors to the United States of America as represented by the United States Atomic Energy Commission
No Drawing. Filed Feb. 4, 1971, Ser. No. 112,771
Int. Cl. B01d 11/04
U.S. Cl. 423—10                                    5 Claims

ABSTRACT OF THE DISCLOSURE

A process for the quantitative separation of americium values from curium values and from other trivalent actinide and lanthanide values contained in a nitric acid feed solution by selectively oxidizing the americium to a higher valence state and extracting the oxidized americium with bis(2,6-dimethyl-4-heptyl) phosphoric acid while the trivalent values remain in the feed solution.

CONTRACTUAL ORIGIN OF THE INVENTION

The invention described herein was made in the course of, or under, a contract with the United States Atomic Energy Commission.

BACKGROUND OF THE INVENTION

This invention relates to a process for the separation of americium values from actinide and lanthanide values. More specifically, this invention relates to a liquid extraction process for the quantitative separation of americium values and curium values.

The demand for curium and americium is increasing as new uses for these transuranium elements are developed. Curium has been used as a heat source in small auxiliary power units which have been used to supply electricity in satellites and space vehicles. Curium-244 can also be irradiated in an isotope reactor to form the heavier transuranium elements such as californium. Americium-241 has found use in fluorescent radiography of organs in the human body, the 60 kev. gamma radiation being used to excite X-ray fluorescence in elements such as $I^{131}$. Americium is also mixed with beryllium as a source of neutrons.

These elements are found, along with other lanthanide and actinide values, in nuclear reactor fuel reprocessing waste solutions and thus are available in reasonable quantities if they can be separated from the waste solutions and purified. Because americium and curium are chemically similar, separation of these elements from each other is difficult.

Separation of the americium and curium values is presently being done by ion exchange or extraction chromatography techniques. By these methods, separation factors of only from 2 to 3 are presently possible, necessitating a large number of columns in order to obtain a pure product. Both of these techniques result in concentrated bands of highly radioactive material which can cause gassing by degradation of organic bed material and complexing agents which affects the separation.

Extraction chromatography utilizing oxidized americium has resulted in far greater separation values. Using di(2-ethylhexyl) phosphoric acid on a silica support and eluting the values with nitric acid, an americium fraction having a decontamination factor from curium of 1000 is attainable, as is a curium decontamination factor from americium of 10 to 14. However, the method is ineffectual in obtaining complete americium-curium separation.

Liquid extraction has also been employed in which the americium is oxidized to a higher valence and extracted with di(2-ethylhexyl) phosphoric acid. Here the problem of preventing reduction of the oxidized americium was difficult to overcome and low separation factors resulted. Also, because of the difficulty in maintaining the americium in an oxidized state, the procedure was useful only for macro amounts of americium.

SUMMARY OF THE INVENTION

We have invented a process for separating americium values and curium values and for separating americium values from other nonoxidizable trivalent lanthanide and actinide values which eliminates many of the disadvantages described heretofore. The process of this invention comprises selectively oxidizing the americium values in an aqueous nitric acid solution containing americium values, curium values and other lanthanide and actinide values in a trivalent state, contacting the aqueous solution with an organic extractant of bis(2,6-dimethyl-4-heptyl) phosphoric acid in a saturated hydrocarbon diluent, whereby the americium values are quantitatively extracted by the organic extractant, and the other values remain in the aqueous solution. The americium values may then be recovered from the organic extractant by stripping with a mineral acid.

It is therefore one object of this invention to provide a process for separating americium values from curium values and from lanthanide and actinide values.

It is another object of this invention to provide a process for separating americium values from curium values and from lanthanide and actinide values in a trivalent state.

It is still another object of this invention to provide a method for separating americium values and curium values.

Finally, it is the object of this invention to provide a method for the quantitative separation of americium values and curium values when said values are contained together in an aqueous nitric acid solution.

DESCRIPTION OF THE PREFERRED EMBODIMENT

These and other objects of this invention can be obtained by preparing an aqueous feed solution containing the americium values and curium values which may contain other lanthanide and actinide values, in a trivalent state, adding $AgNO_3$ and $K_2S_2O_8$ to the feed solution to selectively oxidize the americium to a higher state, contacting this feed solution with an organic extractant of bis(2,6-dimethyl-4-heptyl) phosphoric acid in a saturated hydrocarbon whereby the americium values are quantitatively extracted and the other values remain in the feed solution and recovering the americium values.

Although the extract bis(2,6-dimethyl-4-heptyl) phosphoric acid is dimeric in dry n-heptane, it is of undetermined molecular complexity as used in the process of the invention. The concentration unit, formality, F, defined as the number of formula weights per liter of solution, is thus used throughout this description of the invention for clarity.

The nitric acid feed solution may be from 0.025 to 0.2 F in nitric acid, although the best results were obtained with a concentration of 0.025 F. It is preferable that the hydrogen ion content be kept as low as possible to prevent the formation of hydrogen peroxide which is a reductant and whose presence may reduce or prevent the oxidation of the americium, thus inhibiting the extraction thereof.

The amount of $K_2S_2O_8$ to be added to the feed solution is that necessary to completely oxidize the americium present. Generally, 0.185 F was found to be satisfactory. Too much potassium persulfate could interfere with extraction by persulfate complexing of the americium, although when present in the preferred concentration is has no effect on the distribution values.

The silver nitrate serves as an oxidation path or catalyst to promote the oxidation of the americium and concentrations may range from 0.0025 to 0.025 F for satisfactory results. A higher concentration could result in precipitation of silver.

Although the process is carried out at ambient temperatures, results are improved by heating the feed solution to 40 to 60° C. for 5 to 15 minutes before contacting the feed solution with the organic extractant. This will increase the rate of oxidation of americium and insure that all americium values are oxidized.

The concentration of bis(2,6-dimethyl-4-heptyl) phosphoric acid in the diluent may vary from 0.075 to 1.0 F. However, a concentration of 0.60 F when used with a feed solution concentration of 0.025 F nitric acid was observed to provide the best distribution ratio.

Although n-heptane as a diluent for the organic extractant is satisfactory, any saturated hydrocarbon not subject to oxidation and free from reducing agents would be quite adequate.

Americium is most stable in its lowest or +3 oxidation state and is thus easily reduced. Therefore, it is important that the organic extractant and equipment used in the process be pretreated to remove any trace of reductants which may interfere with the americium separation. This pretreatment may easily be accomplished by contacting the extractant and the equipment with an aqueous 0.025 F nitric acid solution containing 0.185 F $K_2S_2O_8$ and 0.025 F $AgNO_3$ (barren feed solution) to neutralize any reductants which may be present.

The americium may be readily stripped from the organic extractant with an aqueous mineral acid solution if it is first reduced to Am(III). This may be easily accomplished by contacting the organic extractant containing the americium values with an equal volume of 1.0 F nitric acid containing approximately 2% hydrogen peroxide for about 3 minutes. By this procedure less than 0.01% of the americium remains in the organic phase.

The following examples are given as illustrative of the process of this invention and are not to be taken as limiting the scope or the extent of the invention.

Example I

An aqueous feed solution was prepared by taking 50 microliters of dilute americium solution (9230 c.p.m. total alpha), 50 microliters of concentrated curium solution (1.012×10$^6$ c.p.m. total alphas in 0.5 F nitric acid) and 50 microliters of 1.0 F $AgNO_3$ solution which was diluted to 2 ml. with 0.2 F $K_2S_2O_8$ solution to prepare a feed solution containing 0.025 F nitric acid, 0.025 F $AgNO_3$ and 0.185 F $K_2S_2O_8$. To demonstrate the decontamination of americium from curium where americium is the minor component, a 2-ml. portion of this feed solution was heated for 10 minutes at 51° C. and contacted for 3 minutes with 2 ml. of organic extractant consisting of 0.6 F bis(2,6-dimethyl-4-heptyl) phosphoric acid in normal heptane which had been pretreated by contacting with fresh saturated $K_2S_2O_8$ and 0.05 F $AgNO_3$ solution immediately prior to use. The phases were separated and the organic phase was then contacted for 3 minutes with a 2-ml. portion of barren aqueous scrub solution for 3 minutes (0.025 F nitric acid, 0.025 F $AgNO_3$ and 0.185 F $K_2S_2O_8$) which had been heated at 50° C. for 10 minutes just preceding use. The americium/curium ratio which is expressed in terms of alpha counting rates was raised from $9.2 \times 10^{-3}$ in the feed to $9.7 \times 10^2$ in the product. This resulted in a decontamination factor (DF) of americium which exceeded $1.1 \times 10^5$, obtained by dividing the americium/curium ratio in the product by the americium/curium ratio in the feed.

Example II

To demonstrate the decontamination of curium from americium where curium is the minor component, a 2-ml. portion of an aqueous feed solution prepared as described in Example I was contacted successively with four 2-ml. portions of organic extractant prepared as described in Example I. The first contact time was for three minutes and the last three contact times for two minutes each. (The aqueous phase was heated at 50° C. for 10 minutes preceding the first contact, but not between contacts.) The curium/americium ratio was raised from 0.016 in the feed to 25 in the product. The yield of curium was quantitative within experimental error and is known to be greater than 99%. The decontamination factor was $1.6 \times 10^3$.

Example III

To demonstrate mutual decontamination, a 2-ml. portion of feed solution prepared as previously described was contacted successively with four 2-ml. portions of organic extractant phase and was followed by a 2-ml. portion of barren aqueous scrub (that is, a solution identical with the feed solution except that it contained no americium or curium). The feed and scrub solutions were heated at 50° C. for 10 minutes for initial use. The four organic phases were combined and assayed as americium product. The two aqueous phases were combined and assayed as curium product. The americium/curium ratio was raised from 0.61 in the feed to $7.1 \times 10^2$ in the americium product, the decontamination factor being $1.2 \times 10^3$. The curium/americium ratio was raised from 1.6 in the feed to greater than $4.2 \times 10^2$ in the curium product, the decontamination factor being greater than $2.6 \times 10^2$. In the table below are given the results of the three experiments previously described.

| Experiment No. | Feed (aq.) | | Am prod. (org.) | | Cm prod. (aq.) | | D.F. | |
|---|---|---|---|---|---|---|---|---|
| | (c./m.) | (Am/Cm*) | (c./m.) | (Am/Cm*) | (c./m.) | (Cm/Am*) | (Am/Cm) | (Cm/Am) |
| 1 | $1.0 \times 10^5$ | $9.2 \times 10^{-3}$ | $8.9 \times 10^3$ | $>9.7 \times 10^2$ | | | $>1.1 \times 10^5$ | |
| 2 | $6.3 \times 10^5$ | 62 | | | $1.1 \times 10^4$ | 25 | | $1.6 \times 10^3$ |
| 3 | $1.6 \times 10$ | 0.61 | $5.3 \times 10^5$ | $7.1 \times 10^5$ | $9.9 \times 10^5$ | $9.9 \times 10^2$ | $1.2 \times 10^3$ | $>2.6 \times 10^2$ |

*All ratios are expressed in terms of alpha counting rates.
NOTE.—Am=americium values; Cm=curium values.

It is evident from the experiments previously described and from the results in the table that quantitative results are attainable by the process of this invention for the separation of americium values and curium values.

It will be noted that in the strong oxidizing environment of this process, cerium, uranium, neptunium, plutonium and berkelium will be oxidized from the trivalent state with the americium and thus will also be preferentially extracted and will accompany the americium into the organic phase. However, since these values are readily separable from americium by other processes, obtaining pure americium values presents no problem.

It will be understood that the invention described above is not to be limited by the details given herein but that it may be modified within the scope of the appended claims.

The embodiments of the invention in which an exclusive property or privilege is claimed are defined as follows:

1. A process for separating americium values from curium values and other nonoxidizable trivalent lanthanide and actinide values contained in an aqueous nitric acid solution which is 0.025 to 0.2 F. in nitric acid consisting of adding potassium persulfate and silver nitrate to the aqueous solution, thereby selectively oxidizing the americium values in the aqueous solution to a higher oxidation state, contacting the aqueous solution with an organic extractant containing 0.075 to 1.0 F bis(2,6-dimethyl-4-heptyl) phosphoric acid in a saturated hydrocarbon diluent whereby the oxidized americium values are selectively extracted from the aqueous solution and recovering the americium values.

2. The process of claim 1 wherein the aqueous solution is made 0.185 F in potassium persulfate and 0.0025 F in silver nitrate.

3. The process of claim 2 wherein the aqueous solution is heated to 40 to 60° C. for 5 to 15 minutes.

4. The process of claim 2 wherein the saturated hydrocarbon diluent is n-heptane.

5. A process of separating americium values from curium values consisting of dissolving said values in an aqueous solution 0.025 F in nitric acid, making the solution 0.185 F in potassium persulfate and 0.025 F in silver nitrate and heating the solution to 50° C. for 10 minutes, thereby oxidizing the americium values to a higher oxidation state, contacting the aqueous solution with an extractant of 0.6 F bis(2,6-dimethyl-4-heptyl) phosphoric acid in n-heptane, thereby selectively extracting the americium values from the aqueous solution and recovering the americium values.

References Cited

UNITED STATES PATENTS

| | | | |
|---|---|---|---|
| 3,580,705 | 5/1971 | Coleman et al. | 23—341 |
| 3,615,268 | 10/1971 | Moore | 23—343 X |
| 2,909,405 | 10/1959 | Hulet | 23—341 X |
| 2,950,166 | 8/1960 | Seaborg et al. | 23—341 X |
| 3,230,036 | 1/1966 | Kappelmann et al. | 23—341 X |
| 3,378,352 | 4/1968 | Hansen | 23—341 |

CARL D. QUARFORTH, Primary Examiner

E. A. MILLER, Assistant Examiner

U.S. Cl. X.R.

423—250